United States Patent [19]

Srock et al.

[11] Patent Number: 4,905,412

[45] Date of Patent: Mar. 6, 1990

[54] GUIDING DEVICE FOR A VERTICALLY ADJUSTABLE WINDOW PANE

[75] Inventors: Rainer Srock, Warmbronn; Jorg Brettmann, Leonberg; Georg Eger, Hochdorf/Vaihingen, all of Fed. Rep. of Germany

[73] Assignee: Porsche Aktiengesellschaft, Weissach, Fed. Rep. of Germany

[21] Appl. No.: 305,120

[22] Filed: Feb. 2, 1989

[30] Foreign Application Priority Data

Feb. 3, 1988 [DE] Fed. Rep. of Germany ....... 3803118

[51] Int. Cl.$^4$ ............................................. E05F 11/48
[52] U.S. Cl. .......................................... 49/352; 49/375
[58] Field of Search ................................. 49/348–352, 49/374–378, 227

[56] References Cited

U.S. PATENT DOCUMENTS

| | | |
|---|---|---|
| 2,992,039 | 7/1961 | Bretzner . |
| 4,597,223 | 7/1986 | Shiraishi et al. ...................... 49/352 |
| 4,788,794 | 12/1988 | Miller ................................ 49/375 X |
| 4,823,507 | 4/1989 | Miller ................................ 49/348 X |

FOREIGN PATENT DOCUMENTS 1210691 2/1966 Fed. Rep. of Germany .
0183206 6/1986 Fed. Rep. of Germany .

*Primary Examiner*—Philip C. Kannan
*Attorney, Agent, or Firm*—Barnes & Thornburg

[57] ABSTRACT

In a guiding device for a vertically adjustable window pane of vehicle doors, two holding parts, which each have an upper and a lower sliding block and are spaced away from one another, are provided at a lower edge of the window pane, these holding parts being in operative connection with U-profiled tracks of guide rails mounted in the door body. So that, for framelessly guided window panes having a pronounced lateral drop with respect to the door body located underneath, a guiding device is provided which, while it has a simple construction, ensures a functionally appropriate holding of the window pane in all positions, two tracks are constructed at each guide rail. The upper sliding block interacts with the first track, and the lower sliding block interacts with the second track. The tracks of one guide rail and the two sliding blocks of each holding piece are arranged at opposite longitudinal sides of a common connecting web of the guide rail extending transversely to the longitudinal direction of the vehicle.

9 Claims, 4 Drawing Sheets

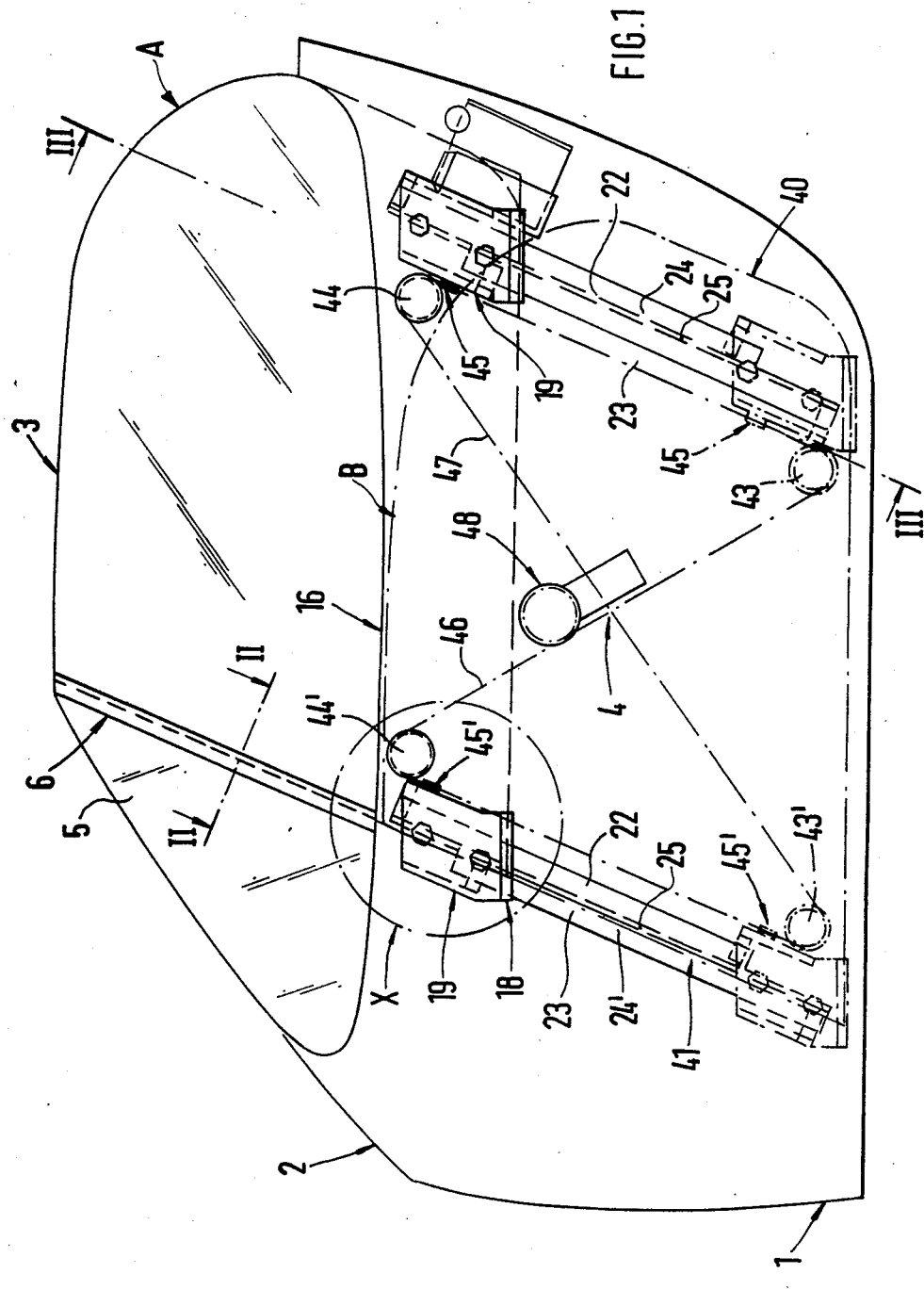

GUIDING DEVICE FOR A VERTICALLY ADJUSTABLE WINDOW PANE

BACKGROUND AND SUMMARY OF THE INVENTION

The invention relates to a guiding device for a curved, vertically adjustable window pane, particularly of vehicle doors. Two holding parts, which are spaced away from one another and each have an upper and a lower sliding block, are arranged at a lower edge area of the window pane and are in operative connection with U-profiled tracks of guide rails mounted in the door body.

In a known guiding device of the initially mentioned type (DE-AS No. 1 210 691), one guide rail respectively having a U-profiled track is arranged adjacent to the upright extending lateral edges of the window pane, the two sliding blocks of each holding part which—viewed in vertical direction—extend at a distance to one another, interacting with the common track. In this case, the two guide rails reach around the front and rear edge of the window pane.

This guiding device has the disadvantage that it is suitable only for a window pane which, in its closed position, extends approximately in parallel to an inside panel of the door body located underneath it. For window panes which have a pronounced lateral drop with respect to the door body located underneath it this guiding device would not be very suitable. In addition, because of the fixed position of the guide rails, the free design of the door body would be limited considerably—particularly in the area of the door lock.

It is an object of the invention to provide, particularly for a framelessly guided window pane having a pronounced lateral drop with respect to the door body located underneath it, a guiding device which ensures a functionally appropriate holding of the window pane in all positions while it has an uncomplicated construction. In addition, the free design of the door body in the lock area should not be impaired.

According to the invention, this object is achieved by providing an arrangement wherein at each guide rail, two tracks are constructed, the upper sliding block interacting with the first track, and the lower sliding block interacting with the second track, and wherein the tracks of a guide rail as well as the sliding blocks of each holding part are arranged at opposite longitudinal sides of a common connecting web of the guide rail extending transversely to the longitudinal direction of the vehicle. Preferred embodiments include further advantageous features which facilitate the construction and operation of the window pane guidance system.

The main advantages achieved by means of the invention are that, as a result of the opposite arrangement of the two tracks of each guide rail and of the sliding blocks of each holding part, a functionally appropriate support of the window pane is ensured in all positions of the window pane in the transverse and the longitudinal direction of the vehicle. Because of the different offset shaping of the tracks according to especially preferred embodiments, this guiding device is suitable particularly for window panes which have a pronounced lateral drop with respect to the door body located underneath them. In addition, the holding parts may be fixed at any point at the window pane; i.e., the pertaining guide rails do not necessarily have to be mounted at the lateral edge of the window pane, where space is required for the door lock.

The holding parts and the guide rail are easy to manufacture and easily mountable in the door. By means of the integration of a window lift mechanism into the guiding device, a compact construction is achieved. In addition, by means of this guiding device, a minimum distance of the window pane is achieved with respect to the adjacent outer contour of the vehicle (low drag coefficient). In addition, during the driving operation, the window pane, by means of the occurring suction forces, is pulled against the sealing of the center web, whereby tightness is increased. When the window pane is lowered slightly, a good ventilation of the vehicle interior is ensured as a result of the shaping of the tracks, since the front edge of the window pane moves away from the center web and forms a gap-shaped opening.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic lateral view of a motor vehicle door having a guiding device for a vertically adjustable window pane constructed in accordance with a preferred embodiment of the invention;

DETAILED DESCRIPTION OF THE DRAWING

Figure 2:
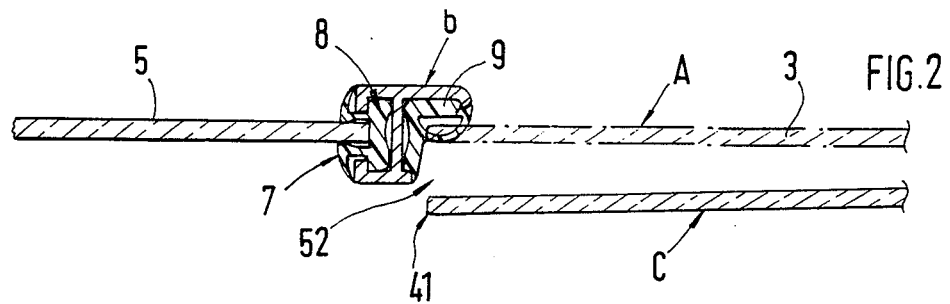
FIG. 2 is an enlarged sectional view taken along Line II—II of FIG. 1.

FIG. 1 shows a vehicle door 1 of a sports car or a coupe. A frameless window pane 3 is liftably and lowerably arranged in the door body 2, specifically by means of a window lift mechanism 4. In addition, the vehicle door 1 comprises a stationary triangular window 5 which is arranged on the side of an upright center web 6 of the vehicle door 1 which is opposite the window pane 3. The triangular window 5, by means of a rubber profile 7, is inserted into an approximately U-shaped receiving device 8 of the center web 6 (FIG. 2). The window pane 3, rests under prestress against a sealing body 9 of the center web 6 only in its completely moved-up closed Position A. When the window pane 3 is lowered, it moves away from the center web 6 or the sealing body 9 and travels toward the outside (for example, intermediate Position C shown in FIG. 2).

Figure 3:
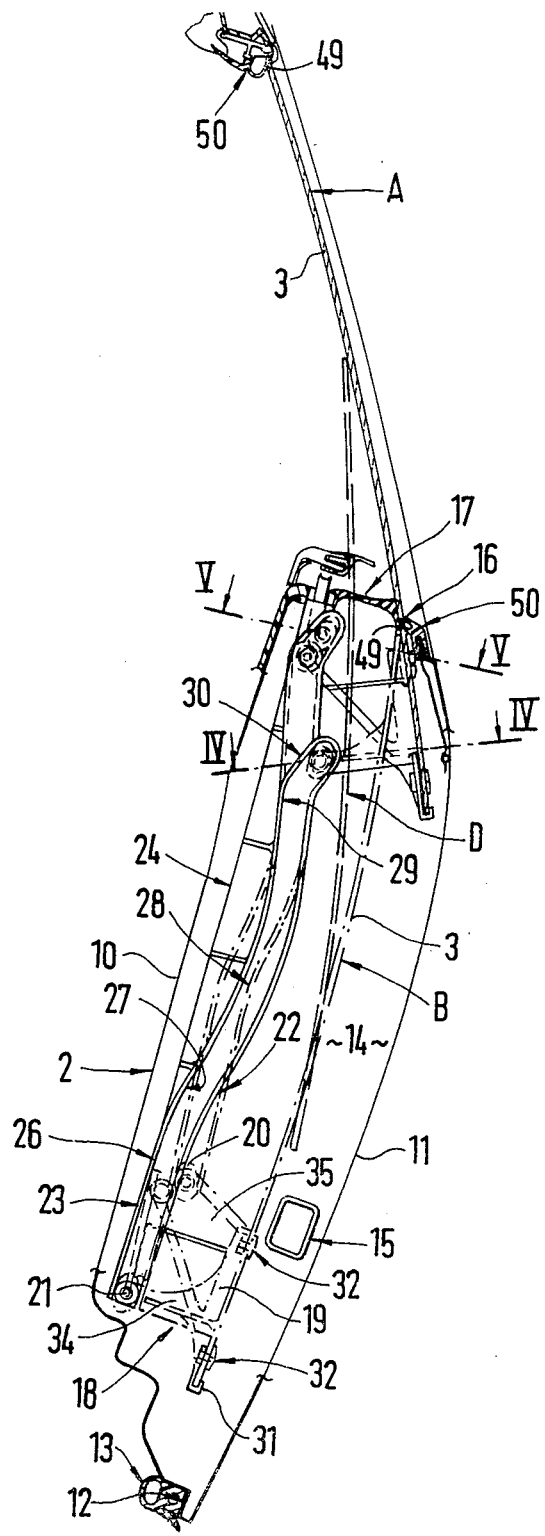
FIG. 3 is an enlarged sectional view taken along Line III—III of FIG. 1.

The door body 2 consists of an inside panel 10 and an outside panel 11 which are firmly connected with one another in a partial area of their circumference while forming a U-shaped groove 12 (FIG. 3). A door sealing profile 13 is inserted into the groove 12. In a lower area of the door body 2, a tube-shaped door reinforcement 15 is arranged inside a door compartment 14. The outside panel 11 of the door, along its vertical course, has a relatively curved shape. In the area of an equator 16, a door compartment opening 17 is provided at the vehicle door 1 for the guiding-through of the window pane 3, the door compartment opening 17, because of the considerable lateral drop (tapering) of the window pane 3 and the vehicle door 1, having a relatively large width. When the window pane 3 is lowered, the door compartment opening 17 is closed off by two sealing profiles, the two sealing profiles being assigned to opposite sides of the window pane 3.

Figure 4:
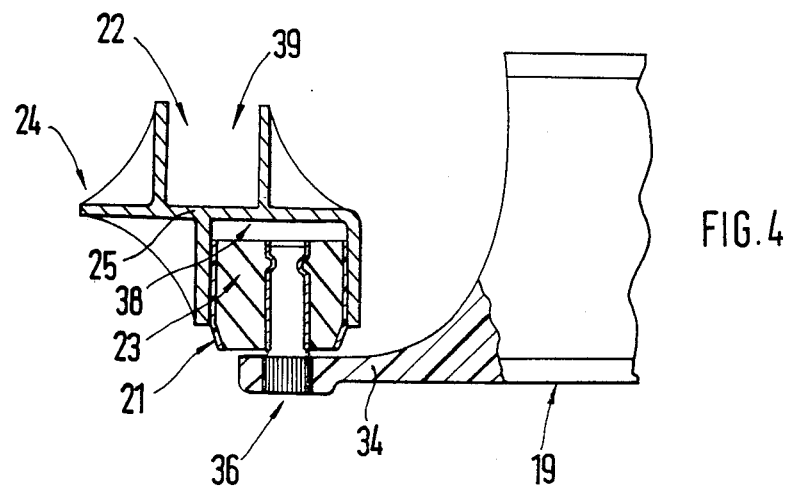
FIG. 4 is an enlarged sectional view taken along Line IV—IV of FIG. 3.

A guiding device 18 for the curved, vertically adjustable window pane 3 is provided inside the door body 2 in the door compartment 14. The guiding device 18 comprises two holding parts 19, each having an upper sliding block 20 and a lower sliding block 21 (see FIGS. 4 and 5) and being arranged at the lower edge area of the window pane 3. The two sliding blocks 20, 21 of each holding piece 19 interact with respective tracks 22, 23 of guide rails 24, 24'. FIG. 6 shows this feature for guide rail 24' which is similar for guide rail 24.

According to FIG. 1, a front guide rail 24' and a rear guide rail 24 are provided at each vehicle door 1, the two guide rails 24, 24', which are arranged in parallel to one another and extend diagonally, being fastened at the door body 2 in a manner which is not shown in detail. The guide rails can be made from a plastic material. Corresponding to FIG. 1, two tracks 22, 23 are constructed at each guide rail 24, 24', the upper sliding block 20 interacting with the first track 22 and the lower sliding block 21 interacting with the second track 23. The tracks 22, 23 of each guide rail 24, 24' as well as the sliding blocks 20, 21 of the pertaining holding part 19 are arranged at opposite longitudinal sides of a common connecting web 25 of the guide rail 24, 24' which extends transversely with respect to the longitudinal direction of the vehicle.

The two U-profiled tracks 22, 23 of each guide rail 24, 24' are arranged offset with respect to one another in vertical and in transverse direction of the vehicle (FIG. 3). The first track 22—viewed in vertical direction—extends approximately from the upper door compartment opening 17 to the door reinforcement 15. The second track 23 is offset downward by the extent E with respect to the first track 22. The two tracks 22, 23 of each guide rail 24, 24' are shaped differently along their longitudinal courses. The shaping of the tracks 22, 23 depends on the lateral drop of the window pane 3 and of the door body 2 and must, in each case, be determined by experimenting.

Each track 22, 23 has a diagonally extending straight lower end area 26, which via a radius-shaped transition area 27, changes over to a connecting center area 28 which is bent toward the outside. The center area 28, via another radius-shaped transition area 29, changes into an end area 30 which tapers off very flatly toward the outside. The length of the individual areas as well as the bending of the center area 28 are different in the individual tracks 22, 23.

Each holding part 19, by means of a U-shaped receiving section 31, reaches around the lower edge of the window pane 3 and, by means of fastening screws 32, is connected with the window pane 3. The fastening screws 32 are guided through openings of the window pane 3 (FIG. 3).

Figure 5:
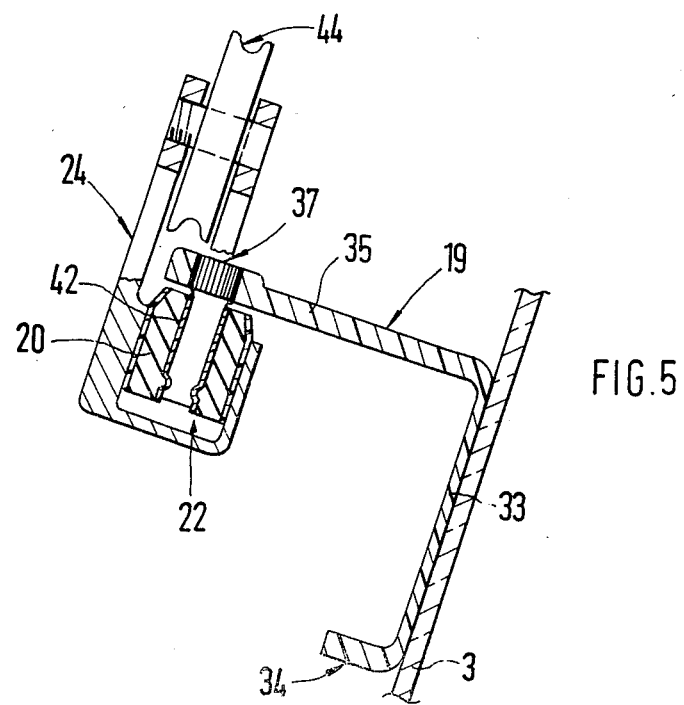
FIG. 5 is an enlarged sectional view taken along Line V—V of FIG. 3.
Figure 6:
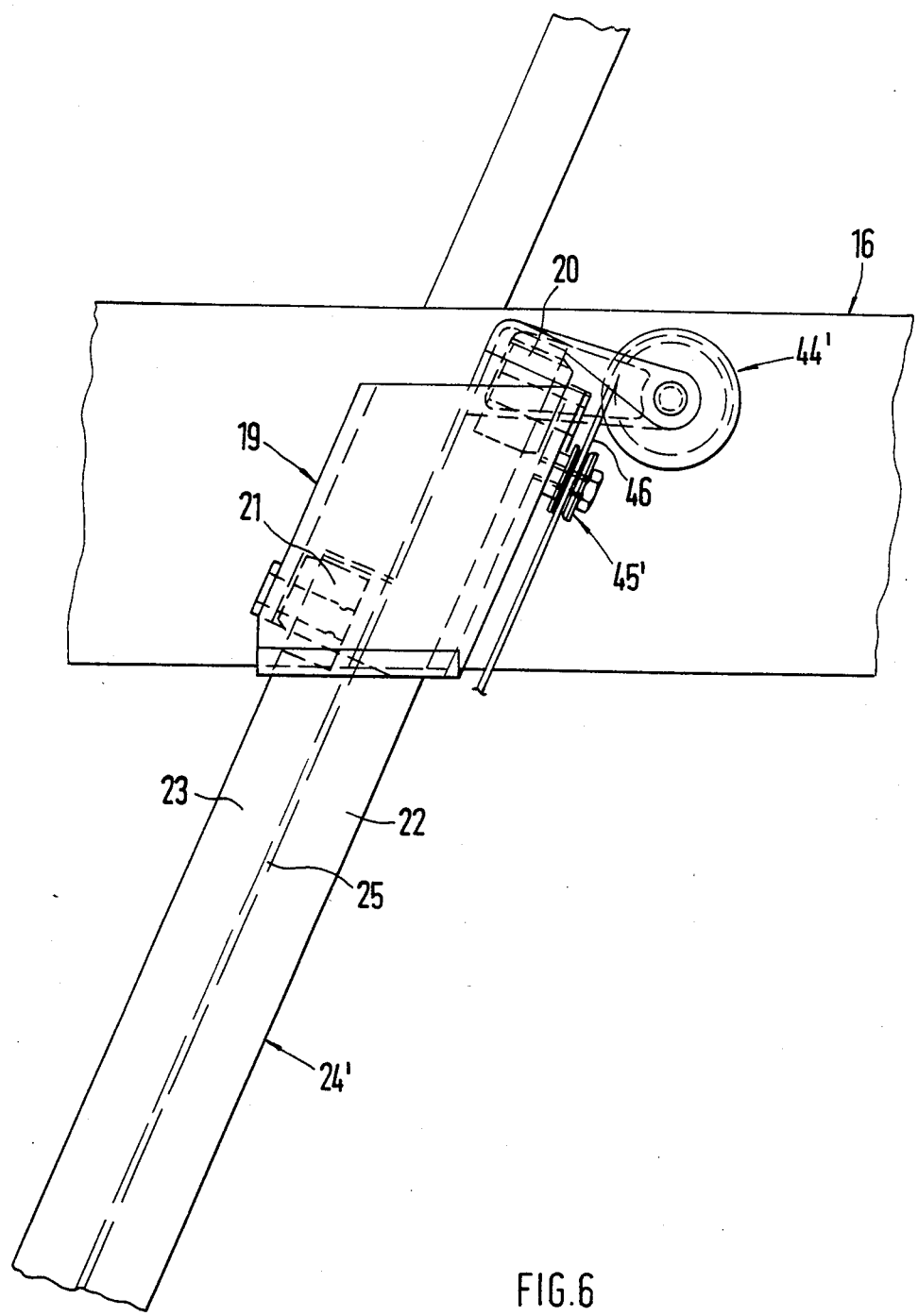
FIG. 6 is an enlarged detail of area X of FIG. 1.

According to FIG. 5, the holding part 19 has a center part 33, which extends in parallel to the window pane 3, a leg 34, 35, which extends approximately rectangularly with respect to the center part 33, extending away from each free end of the center part 33. The two sliding blocks 20, 21 are arranged adjacent to the free ends 36, 37 of the legs 34, 35. The sliding blocks 20, 21 are aligned approximately in parallel with respect to the window pane 3 and are, in each case, directed toward the open sides 38, 39 of the tracks 23. The sliding block 20 is assigned to leg 35, and the sliding block 21 is assigned to leg 34.

The two legs 34, 35 of the holding part 19 have different shapes and are offset with respect to one another in vertical direction (FIG. 3). Viewed in longitudinal direction, the holding parts 19 may be fastened at any point at the window pane; i.e., they do not necessarily have to be arranged at the upright extending longitudinal sides 40, 41 of the window pane 3, but may also extend at a distance with respect to the longitudinal sides 40, 41.

The leg 34, which carries the lower sliding block 21, has an approximately L-shaped profile, whereas the other leg 35 is constructed to be approximately trapezoid. The upper and the lower sliding blocks 20, 21 are constructed to be identical and are made of a plastic material. The sliding blocks 20, 21, which have an approximately oval shape, are clipped onto a pipe section 42 which extends vertically away from the legs 34, 35 of the holding part 19. By means of the relatively large vertical offsetting of the sliding blocks 20, 21, a good holding of the frameless window pane 3 is ensured in all positions.

A particularly compact construction of the guiding device 18 and of the window lift mechanism 4 is achieved in that the window lift mechanism 4 is at least partially integrated into the guiding device 18. In the embodiment, the window lift mechanism 4 is constructed as a cable-operated window lift mechanism, the cable pulleys or deflection pulleys of which are pivoted at the guide rails 24, 24' and at the holding parts 19. At the lower and at the upper edge of the guide rails 24, 24', one deflection pulley 43, 44, 43', 44' respectively is arranged, the axes of rotation of which extending in transverse direction of the vehicle. In addition, one or two cable pulleys 45, 45' are arranged at each holding part 19, the axes of rotation of which being aligned approximately at a right angle with respect to the legs 34, 35 of the holding part 19. The cable pulleys 45, 45' accommodate the eye-shaped end areas of the two traction cables 46, 47 of the cable-operated window lift mechanism, which are not shown in detail.

The traction cable 46 extends from the upper cable pulley 45, via the adjacent deflection pulley 44', diagonally to the opposite deflection pulley 43 and then to the adjacent lower cable pulley 45. At least one traction cable 46, 47 interacts with a manual or electric driving device 48.

When the window pane 3 is lowered completely (Position B), the two holding parts 19 are located in a lower area of the door body 2, specifically adjacent to the door reinforcement 15, the sliding blocks 20, 21 projecting partially from the tracks 22, 23, which are open in downward direction. In this Position B, the window pane 3 is hidden inside the door body 2, the upper edge 49 of the pane, in sections, resting against the adjacent sealing profile.

FIG. 3 shows another intermediate Position D of the window pane 3 drawn as a dashed line.

In the completely moved-up closed Position A of the window pane 3, both sliding blocks 20, 21 extend adjacent to the upper closed ends of the tracks 22, 23. The upper pane edge 49, in the closed Position A, under prestress, interacts with a guiding profile 50 arranged at the roof side, the window pane 3 extending approximately flush with the shell with respect to the adjacent body contour.

Even when the window pane 3 is lowered slightly (travel of approximately 20 mm), the front longitudinal edge 41, viewed in transverse direction, moves so far toward the outside that, between the center web 6 and the longitudinal edge 41, a sufficiently large gap-type opening 52 is created permitting a good ventilation of the passenger compartment (intermediate Position C of the window pane 3 in FIG. 2).

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A guiding device for a curved, vertically adjustable window pane, particularly of vehicle doors, comprising:
    guide rails with U-profiled tracks mounted in the door body, and
    two holding parts which are spaced away from one another and each have an upper and a lower sliding block, and being arranged at a lower edge area of the window pane and being in operative connection with the U-profiled tracks,
    wherein, at each guide rail, two tracks are constructed, the upper sliding block interacting with the first track, and the lower sliding block interacting with the second track, and wherein the tracks of a guide rail as well as the sliding blocks of each holding part are arranged at opposite longitudinal sides of a common connecting web of the guide rail extending transversely to the longitudinal direction of the vehicle.

2. A guiding device according to claim 1, wherein the two tracks of each guide rail are offset with respect to one another in vertical direction and in transverse direction of the vehicle.

3. A guiding device according to claim 1, wherein the two tracks of each guide rail are shaped differently along their longitudinal course.

4. A guiding device according to claim 3, wherein each track is composed of a diagonally extending, straight-line lower end area, a connecting center area which is bent toward the outside, and an upper end area which tapers off flatly toward the outside.

5. A guiding device according to claim 1, wherein the guide rails are made of a plastic material.

6. A guiding device according to claim 1, wherein the sliding blocks are made of a suitable plastic material.

7. A guiding device according to claim 1, wherein the holding parts, viewed in longitudinal direction, can be mounted at any point at the window pane.

8. A guiding device according to claim 1, wherein a window lift mechanism is integrated into the guiding device.

9. A guiding device according to claim 8, wherein pivotable cable pulleys or deflection pulleys of a cable-operated window lift mechanism arranged at both guide rails and at the holding parts.

* * * * *